Jan. 17, 1939.     R. A. BUTTER ET AL     2,144,361
FERTILIZER DISTRIBUTOR
Filed Sept. 1, 1937
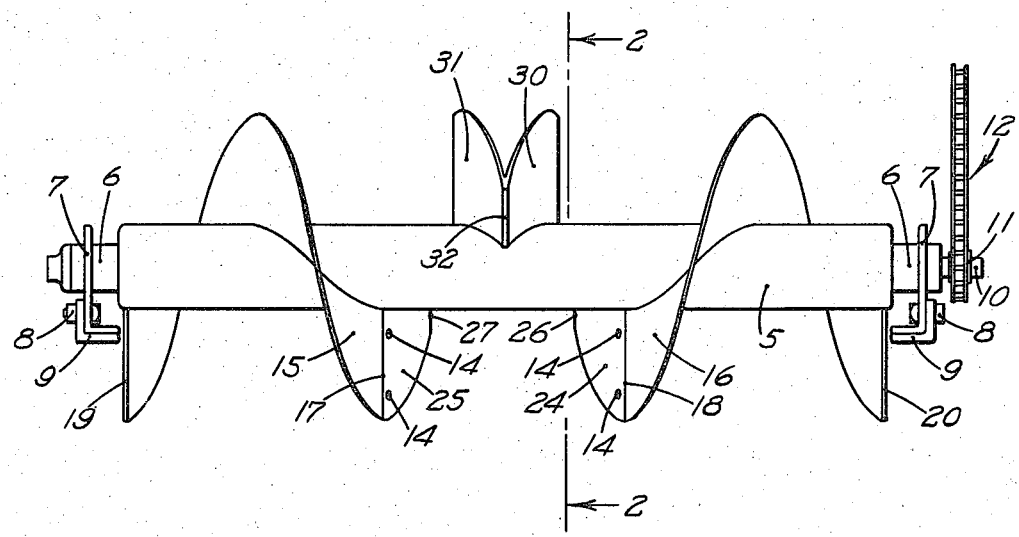
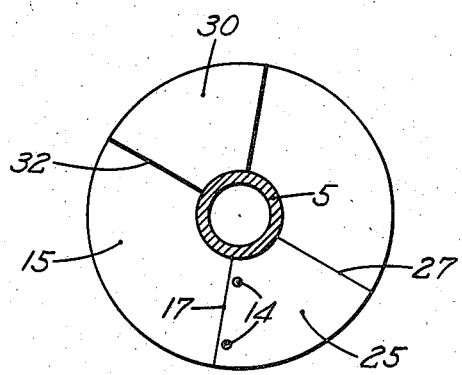
WITNESS
H. E. Kidder
INVENTORS
RUSSELL A. BUTTER
LEONARD B. NEIGHBOUR
BY
ATTORNEYS Patented Jan. 17, 1939

2,144,361

UNITED STATES PATENT OFFICE 2,144,361

FERTILIZER DISTRIBUTOR

Russell A. Butter, Orion, and Leonard B. Neighbour, Moline, Ill., assignors to Deere & Company, Moline, Ill., a corporation of Illinois Application September 1, 1937, Serial No. 161,955

5 Claims. (Cl. 275—6)

The present invention relates to fertilizer distributors and more particularly to widespread devices on manure spreaders.

As is true with all high speed rotative machinery, it is essential that the widespread be balanced both statically and dynamically so that vibration is reduced to a minimum and bearings are saved from excessive wear. In Patent No. 2,015,245, issued September 24, 1935, to Starley S. Swanson, is shown a widespread, comprising a drum on which are fixed two oppositely directed helicoid vanes of like dimensions, each of which describes one complete revolution, or 360 degrees, around the drum and which is, therefore, perfectly balanced.

We have found, however, that in the wider gauge widespreads a more efficient distribution of material is secured by using a pair of oppositely directed helicoid vanes of greater than 360 degrees spread.

One of the objects of the present invention, therefore, is to provide a statically and dynamically balanced widespread using a helicoid vane wound upon a drum through any degree of revolution in excess of 360 degrees. In the accomplishment of this object, the portion in excess of 360 degrees is balanced by a like portion provided on the opposite side of the drum.

Another object is concerned with the provision of a widespread of the helicoid vane type which is readily fabricated in any width and of a standard pitch or lead for various size fertilizer distributors without necessitating forming helicoid vanes of different leads.

These and other objects and advantages will become apparent after a consideration of the following detailed description of an embodiment of our invention, reference being had to the drawing appended hereto, in which Figure 1 is an elevational view of a widespread embodying the principles of my invention, and Figure 2 is a sectional view taken along the line 2—2 of Figure 1.

Referring to the drawing, the widespread comprises a transversely disposed shaft or drum 5 which is journaled for rotation at its two ends in bearings 6. Each of the bearings 6 is supported in an L-shaped bracket 7 which is fixed, as by bolts 8, to the rear ends of the angle iron frame members 9 of the vehicle (not shown). At the right end of the widespread, fixedly mounted on a shaft extension 10 is a sprocket 11 which is engaged by a driving chain 12. Power for driving the widespread is generally derived from the power take-off shaft of the tractor drawing the manure spreader, and is transmitted through suitable power transmission means to the driving chain 12.

Wound about the drum 5 and rigidly fixed thereto in any suitable manner, are two oppositely directed helicoid vanes 15 and 16, extending inwardly from the outer edges of the drum 5. The angle included between the inner edges 17, 18 and the outer edges 19, 20, respectively, is exactly 360 degrees, and all four edges 17, 18, 19, 20 lie in the same axial plane and on the same side of the axis of the drum. As shown, the inner edges 17, 18 are spaced apart an appreciable distance from each other and are symmetrically disposed at opposite sides of the transverse center line of the drum 5.

Vane 16 is extended beyond 360 degrees through a partial revolution by an additional vane segment 24, which is fixed on the drum 5 adjacent the inner edge 18, and fastened to the vane 16 by bolts or rivets 14. Vane 15 is extended an equal distance by a like vane segment 25 which is fixed on the drum adjacent the inner edge 17. Inasmuch as both vane segments 24 and 25 start in the same axial plane and on the same side of the axis of the drum, and both are of like dimensions, it is evident that their inner edges 26 and 27 also lie in the same axial plane.

Symmetrically disposed on either side of the transverse center line of the drum 5, midway between and diametrically opposite to the two vane segments 24, 25, are two oppositely directed vane segments 30, 31 which act to balance the segments 24, 25. In the preferred embodiment illustrated, the leading edges of the segments are joined, as by welding, to form a common leading edge 32, providing a rigid construction in which the segments 30, 31 brace each other.

From the foregoing description it can be seen that the widespread actually comprises two distributing elements, each of which is statically and dynamically balanced, and which, in combination, form a perfectly balanced unit. The two end vanes 15 and 16 are, in themselves, inherently balanced as has been explained. The center portion comprises two pairs of identical vane segments disposed at 180 degrees to each other, each of which acts to balance the other.

From a production standpoint my invention lends itself readily to a wide variety of spreader widths using a helicoid vane of the same lead. For the narrow width widespread, the two 360 degree helicoid vanes disposed adjacent to each other on the drum are sufficient. Where a greater width is required, the two 360 degree vanes are disposed at the outer ends of the drum and an extension segment equal in axial length to substantially one-fourth of the distance between the inner ends is added to each vane. The extensions are then balanced by like sections of vane disposed midway between and opposite to them.

What we claim as our invention is:

1. A widespread device comprising a shaft, a helicoid vane wound on said shaft through an angular spread of 360 degrees plus an additional angle, and a helicoid vane segment having an angular spread equal to said additional angle and disposed on said shaft opposite to the portion of the first named vane included by said additional angle, whereby said vane segment counterbalances that portion of the first-named vane which is in excess of 360 degrees.

2. A widespread device comprising a shaft, a pair of oppositely directed helicoid vanes coaxially disposed on said shaft, each of said vanes having an angular spread of 360 degrees plus an additional angular portion, and a pair of helicoid vane segments, each segment having an angular spread equal to that of one of said additional angular portions and disposed on said shaft opposite thereto, whereby said widespread is statically and dynamically balanced.

3. A widespread device comprising a shaft, a pair of oppositely directed helicoid vanes of like dimensions, each of said vanes being wound on said shaft through an angular spread greater than 360 degrees, the inner ends of said vanes being disposed in the same axial plane and on the same side of the axis of the shaft, and a pair of oppositely directed vanes of the same dimensions as the segments of said first named vanes in excess of 360 degrees, disposed intermediate the inner ends of said first named vanes and on the opposite side of the shaft thereof, whereby said last named vanes balance the portions of said first named vanes in excess of 360 degrees.

4. A widespread device comprising a shaft, a pair of oppositely directed helicoid vanes of like dimensions, each of said vanes being wound on said shaft through an angular spread greater than 360 degrees, the inner ends of said vanes being disposed in the same axial plane and on the same side of the axis of the shaft, and a pair of oppositely directed vanes of the same dimensions as the segments of said first named vanes in excess of 360 degrees, disposed intermediate the inner ends of said first named vanes and diametrically opposite thereto, said last named vanes intersecting to form a common leading edge.

5. A widespread device for manure spreaders comprising a drum and two oppositely directed helicoid vanes of like dimensions on said drum, the inner and outer ends thereof being disposed in the same axial plane and on the same side of the axis of the drum, the inner ends of said vanes being spaced a substantial distance apart and symmetrically disposed at opposite sides of the transverse center line of the widespread device, whereby said drum and associated vanes is statically and dynamically balanced, and additional distributing means disposed on said drum intermediate the inner ends of said vanes, said additional distributing means being, in itself, statically and dynamically balanced.

RUSSELL A. BUTTER.
LEONARD B. NEIGHBOUR.